United States Patent
Schilder et al.

(10) Patent No.: US 10,544,854 B2
(45) Date of Patent: Jan. 28, 2020

(54) DRIVE DEVICE, IN PARTICULAR FOR AN ELECTRIC VEHICLE

(71) Applicant: DAIMLER AG, Stuttgart (DE)

(72) Inventors: Tobias Schilder, Filderstadt (DE); Josep Maria Bou Romano, Stuttgart (DE); Klaus Riedl, Tübingen (DE); Tobias Haerter, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/087,279

(22) PCT Filed: Mar. 2, 2017

(86) PCT No.: PCT/EP2017/000281
§ 371 (c)(1),
(2) Date: Sep. 21, 2018

(87) PCT Pub. No.: WO2017/162327
PCT Pub. Date: Sep. 28, 2017

(65) Prior Publication Data
US 2019/0100092 A1 Apr. 4, 2019

(30) Foreign Application Priority Data
Mar. 23, 2016 (DE) .......... 10 2016 003 575

(51) Int. Cl.
*F16H 3/66* (2006.01)
*B60K 1/00* (2006.01)
(Continued)

(52) U.S. Cl.
CPC ........... *F16H 3/66* (2013.01); *B60K 1/00* (2013.01); *B60K 6/365* (2013.01); *B60K 6/387* (2013.01);
(Continued)

(58) Field of Classification Search
CPC ............ F16H 3/66; F16H 2200/201; F16H 2200/2038; F16H 2200/0021
See application file for complete search history.

(56) References Cited

U.S. PATENT DOCUMENTS 5,342,257 A * 8/1994 Hotta ............... F16H 3/663
475/275
6,953,409 B2 10/2005 Schmidt et al.
(Continued)

FOREIGN PATENT DOCUMENTS

CN 1898482 A 1/2007
DE 2521831 A1 11/1976
(Continued)

OTHER PUBLICATIONS

International Search Report dated Apr. 11, 2017 in related International Application No. PCT/EP2017/000281.

*Primary Examiner* — Erin D Bishop
(74) *Attorney, Agent, or Firm* — Patent Portfolio Builders PLLC

(57) ABSTRACT

An electric vehicle drive includes an electric motor, an axle drive and a multistep reduction gear that is arranged between the electric motor and the axle drive, is intended in structural terms for shifting at least two forward gears, and includes precisely three planetary gear stages that are operatively interconnected includes sun gears, internal gears and planet carriers, a transmission input element for attaching the electric motor for conjoint rotation, and a transmission output element for attaching the axle drive for conjoint rotation. The transmission input element being permanently connected to the sun gear of the first planetary gear stage for conjoint rotation. The transmission output element being permanently connected to the planet carrier of the third planetary gear stage for conjoint rotation. At least the planet (Continued)

Figure 1:
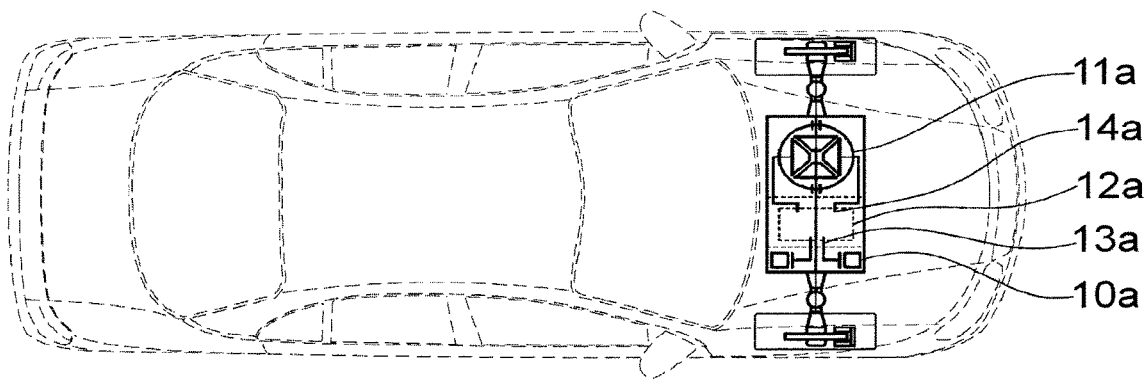

carrier of the first planetary gear stage and the sun gear of the third planetary gear stage are permanently interconnected for conjoint rotation.

7 Claims, 5 Drawing Sheets

(51) Int. Cl.
    *B60K 6/365*      (2007.10)
    *B60K 6/387*      (2007.10)
    *F16H 3/44*      (2006.01)
    *B60K 6/52*      (2007.10)

(52) U.S. Cl.
    CPC .......... *B60K 6/52* (2013.01); *B60K 2001/001* (2013.01); *B60Y 2400/73* (2013.01); *F16H 2003/442* (2013.01); *F16H 2200/0021* (2013.01); *F16H 2200/0034* (2013.01); *F16H 2200/0039* (2013.01); *F16H 2200/201* (2013.01); *F16H 2200/2038* (2013.01); *F16H 2200/2064* (2013.01); *F16H 2200/2094* (2013.01)

(56) References Cited

U.S. PATENT DOCUMENTS

| | | | |
|---|---|---|---|
| 7,179,186 | B2 | 2/2007 | Bucknor et al. |
| 7,189,181 | B2 * | 3/2007 | Gumpoltsberger ..... F16H 3/663 |
| | | | 475/278 |
| 7,238,131 | B2 | 7/2007 | Raghavan et al. |
| 2007/0219036 | A1 | 9/2007 | Bucknor et al. |
| 2007/0275807 | A1 | 11/2007 | Bucknor et al. |

FOREIGN PATENT DOCUMENTS

| | | |
|---|---|---|
| DE | 112005003356 T5 | 4/2008 |
| DE | 112005003331 T5 | 5/2008 |
| DE | 102008038085 A1 | 2/2010 |
| DE | 102012016664 A1 | 2/2014 |
| DE | 102013214317 A1 | 1/2015 |
| FR | 2847321 A1 | 5/2004 |
| WO | 2012010340 A1 | 1/2012 |
| WO | 2015169837 A1 | 11/2015 |

\* cited by examiner

DRIVE DEVICE, IN PARTICULAR FOR AN ELECTRIC VEHICLE

BACKGROUND AND SUMMARY OF THE INVENTION

Exemplary embodiments of the invention relate to a drive device for a motor vehicle, in particular an electric vehicle or a motor vehicle comprising at least one drive axle that is driven purely electrically.

A drive device for an electric vehicle is already known from WO 2012/010340 A1, comprising an electric motor, an axle drive, and a multistep reduction gear arranged between the electric motor and the axle drive.

DE 25 21 831 A1 discloses a drive device that comprises a multistep reduction gear having three planetary gear stages, a transmission input element being permanently connected to a sun gear of the first planetary gear stage for conjoint rotation, a transmission output element being permanently connected to the planet carrier of the third planetary gear stage for conjoint rotation, and the planet carrier of the first planetary gear stage and the sun gear of the third planetary gear stage being permanently interconnected for conjoint rotation.

The invention, in particular, is directed to providing a developed drive device for an electric vehicle.

According to the invention, a drive device is proposed, in particular for an electric vehicle, comprising at least one electric motor, at least one axle drive and at least one multistep reduction gear that is arranged between the electric motor and the axle drive, which is intended at least in structural terms for shifting two forward gears and comprises precisely three planetary gear stages that are operatively interconnected and comprise sun gears, internal gears and planet carriers, at least two shift units, a transmission input element for attaching the electric motor for conjoint rotation, and a transmission output element for attaching the axle drive for conjoint rotation, the transmission input element being permanently connected to the sun gear of the first planetary gear stage for conjoint rotation, the transmission output element being permanently connected at least to the planet carrier of the third planetary gear stage for conjoint rotation, and at least the planet carrier of the first planetary gear stage and the sun gear of the third planetary gear stage being permanently interconnected for conjoint rotation.

Such a design makes it possible to provide a compact drive device for an electric vehicle that allows for advantageous attachment of the electric motor to the axle drive. The multistep reduction gear can provide various forward gears by means of which a drive torque output by the electric motor can advantageously be converted. Shiftability of reverse gears can be dispensed with by way of the electric motor being designed for a reversal in the direction of rotation. Component stresses can be reduced at least in part in the proposed multistep reduction gear on account of the basic structure thereof, as a result of which, in particular, light-weight construction can be simplified. The differently geared forward gears mean that the electric motor can be operated highly efficiently even at high vehicle speeds. At low speeds, a torque of the electric motor can be advantageously converted. Transmission ratios of the forward gears and/or of the axle drive can be adjusted to an embodiment of the electric vehicle at least in part. A flexible drive device can be provided.

In this context, "drive device comprising at least one electric motor, at least one axle drive and a multistep reduction gear arranged between the electric motor and the axle drive" is intended to mean, in particular, a drive device that only comprises electric motors for generating a drive torque. This is intended to mean, in particular, a drive device that is independent of an internal combustion engine. In this context, a "multistep reduction gear" is intended to mean, in particular, a transmission arranged between the electric motor and the axle drive for shifting the differently geared forward gears. A "planetary gear stage" is furthermore intended to mean, in particular, a gear stage that is defined by intermeshing between a sun gear and a planetary gear guided by a planet carrier, and/or intermeshing between a planetary gear guided by a planet carrier, and an internal gear. In principle, the planetary gear stages can be integral, at least in part. In particular, it is conceivable for two of the planetary gear stages to comprise a common internal gear and separate sun gears, or a common sun gear and separate internal gears. An "axle drive" is intended to mean, in particular, an operative connection between the transmission output element of the multistep reduction gear and at least one driving wheel of the motor vehicle. The axle drive may be intended for permanently connecting the transmission output element and the driving wheel for conjoint rotation. Alternatively, the axle drive may also comprise a differential gear that is intended for attaching two driving wheels to the transmission output element so as to be in parallel.

The planetary gear stages are denoted in the following as "first planetary gear stage", "second planetary gear stage" and "third planetary gear stage". The designations "first", "second" and "third" planetary gear stage are, in particular, intended for specifying an axial arrangement, it being possible for an axial sequence of the planetary gear stages to deviate from the numbering. In principle, a modified arrangement of the planetary gear stages and/or a stacked arrangement in which the planetary gear stages are nested inside one another radially, at least in part, is conceivable. Different, kinematically equivalent transmission structures can be achieved, in particular, by spatially rearranging the shift units, by a different arrangement of transmission elements and/or by swapping the sun gears, planetary gears and/or internal gears. In this case, "kinematically equivalent transmission structures" is intended to mean transmission structures that have the same number of shift units and identical shifting models for shifting the forward gears and the reverse gears.

A "shift unit" is furthermore intended to mean, in particular, a unit comprising exactly two coupling elements that are rotatable relative to one another and are intended to be interconnected for conjoint rotation. A shift unit can optionally be formed as a clutch or as a brake. A shift unit formed as a "clutch" is intended to mean, in particular, a shift unit arranged in a power flow between two of the planetary gear stages and intended to interconnect for conjoint rotation, in a closed state, the two rotatable coupling elements thereof that are rotatable independently of one another in an open state. A shift unit formed as a "brake" is intended to mean, in particular, a shift unit arranged in an operative manner between one of the planetary gear stages and a transmission housing and that is intended, in a closed state, to connect for conjoint rotation the rotatable coupling element thereof that is rotatable independently of the transmission housing in an open state, and the coupling element thereof that is connected to the transmission housing for conjoint rotation. "Connected for conjoint rotation" is intended, in particular, to mean a connection in which a power flow is transmitted so as to have an unchanged torque, an unchanged direction of rotation and/or an unchanged speed, averaged over a complete rotation.

In this context, a shift unit is intended, in particular, not to mean a clutch that is connected upstream or downstream of a gear set formed by the planetary gear stages. A "clutch connected upstream of the gear set" is intended, in particular, to mean a clutch arranged in a power flow between the electric motor and the transmission input element in at least one gear, such as a separating clutch or a starting clutch. A "clutch connected downstream of the gear set" is intended, in particular, to mean a clutch arranged in a power flow between the transmission output element and the axle drive in at least one gear, such as a four-wheel clutch. In principle, shiftability of the multistep reduction gear can be increased by means of a clutch unit upstream or downstream of the gear set. In this case, a "transmission input element" is intended, in particular, to mean a transmission element intended, at least in terms of structure, for attaching a rotor of the electric motor for conjoint rotation. A "transmission output element" is intended, in particular, to mean a transmission element intended, at least in terms of structure, for attaching an axle drive for conjoint rotation. A "transmission element" is intended, in particular, to mean a design intended for permanently connecting the sun gears, planet carriers, internal gears and/or coupling elements for conjoint rotation.

"At least in terms of structure" is intended, in particular, to mean that a corresponding design is provided structurally, but it is possible to refrain from functional use of the structural design in a possible embodiment. In this context, "intended in terms of structure for shifting a gear" is intended, in particular, to mean that the shift units and planetary gear stages can, in principle, mechanically form a corresponding gear, irrespective of whether or not shifting of the gear is omitted within the context of a shifting strategy. For example, in one embodiment, the shift units may be intended in terms of structure for shifting more forward gears than it may be expedient to shift within the context of an operating strategy for the multistep reduction gear.

"Decoupling a planetary gear stage" is intended, in particular, to mean that the planetary gear stage is removed from transmission of a power flow between the transmission input element and the transmission output element. A "shift unit for decoupling a planetary gear stage" is intended to mean an individual shift unit intended merely for attaching the sun gear, the planet carrier or the internal gear of the planetary gear stage to the remaining planetary gear stages. If the shift unit is open, the sun gear, the planet carrier or the internal gear are freely rotatable relative to the sun gears, the planet carriers and the internal gears of the remaining planetary gear stages and to the transmission housing, as a result of which the decoupled planetary gear stage does not have any support for transmitting a torque.

Some of the shift units are preferably designed in an interlocking manner. A drag loss can thus be kept small, with the result that a power loss inside the multistep reduction gear can advantageously be reduced. In this case, a "shift unit designed in an interlocking manner" is intended, in particular, to mean a shift unit comprising toothing and/or claws for connecting the coupling elements thereof or for attaching the coupling elements thereof, which toothing and/or claws mutually engage in an interlocking manner to establish a connection for conjoint rotation, transmission of a power flow in an fully closed state occurring at least mainly by means of an interlocking connection. The shift units can in principle be designed in a frictional or interlocking manner. In this case, a "shift unit designed in a frictional manner" is intended, in particular, to mean a shift unit comprising at least two friction partners for connecting the coupling elements thereof or for attaching the coupling elements thereof, which friction partners are in frictional contact with one another in order to establish a connection for conjoint rotation, transmission of a power flow in a fully closed state occurring at least mainly by means of friction. A clutch unit designed in a frictional manner is preferably designed as a disc clutch unit, and a brake unit designed in a frictional manner is preferably designed as a disc brake unit. A clutch unit designed in an interlocking manner is preferably designed as a claw clutch unit, and a brake unit designed in an interlocking manner is preferably designed as a claw brake unit. A shift unit designed in an interlocking manner is advantageously shiftable by means of a sliding sleeve. In this case, the shift units designed in an interlocking manner are preferably designed without a frictional synchronizer, but may in principle also comprise a frictional synchronizer.

The multistep reduction gear preferably comprises actuators for automated shifting of the shift units. It is in principle also possible, however, to design at least some of the shift units so as to shift automatically at least in part. An automatically shifting clutch unit or brake unit is preferably designed as a freewheeling mechanism. Moreover, a design of the planetary gear stages having single planetary gear sets or double planetary gear sets may also deviate from the embodiments shown. In a kinematically equivalent manner it is possible, for example, to replace a single planetary gear set with a double planetary gear set, it additionally being necessary to, in particular, adjust a stationary transmission ratio of the planetary gear stage in order to achieve kinematically identical operation. In particular in the case of an embodiment using a double planetary gear set, it is in principle also possible to switch an attachment of a sun gear and a planet carrier, an internal gear and a planet carrier, or a sun gear and an internal gear, it additionally being necessary to, in particular, adjust a stationary transmission ratio of the planetary gear stage in order to achieve kinematically identical operation.

In the following, the terms "axial" and "radial" relate, in particular, to the main axis of rotation of the multistep reduction gear, and therefore the expression "axial", in particular, denotes a direction extending in parallel with or coaxially to the main axis of rotation. Furthermore, the expression "radial", in particular, denotes a direction extending perpendicularly to the main axis of rotation. "Arranged on the transmission input side" is intended, in particular, to mean that the component in question is arranged on a side of the further component facing the transmission input element and/or the electric motor. "Arranged on the transmission output side" is intended, in particular, to mean that the component in question is arranged on a side of the further component that faces away from the transmission input element and/or the electric motor, even if the further component is arranged after the transmission output element in the axial direction, for example because the transmission output element is arranged between two planetary gear stages.

Further advantages can be seen from the following description of the figures. A plurality of embodiments of the invention are shown in the figures. In order to distinguish the embodiments, the reference signs of the following description of the figures have been supplemented by the letters a to c. With reference to identically denoted components, in particular with reference to components having the same reference signs, reference is in principle made to the description and/or the drawings of the first embodiment having the letter a. The descriptions of the further embodiments are substantially limited to the differences between the embodiments. The figures, the description of the figures and the claims contain numerous features in combination. Expediently, a person skilled in the art will also consider the features individually and combine them to form meaningful further combinations.

BRIEF DESCRIPTION OF THE DRAWING FIGURES

Figure 2:
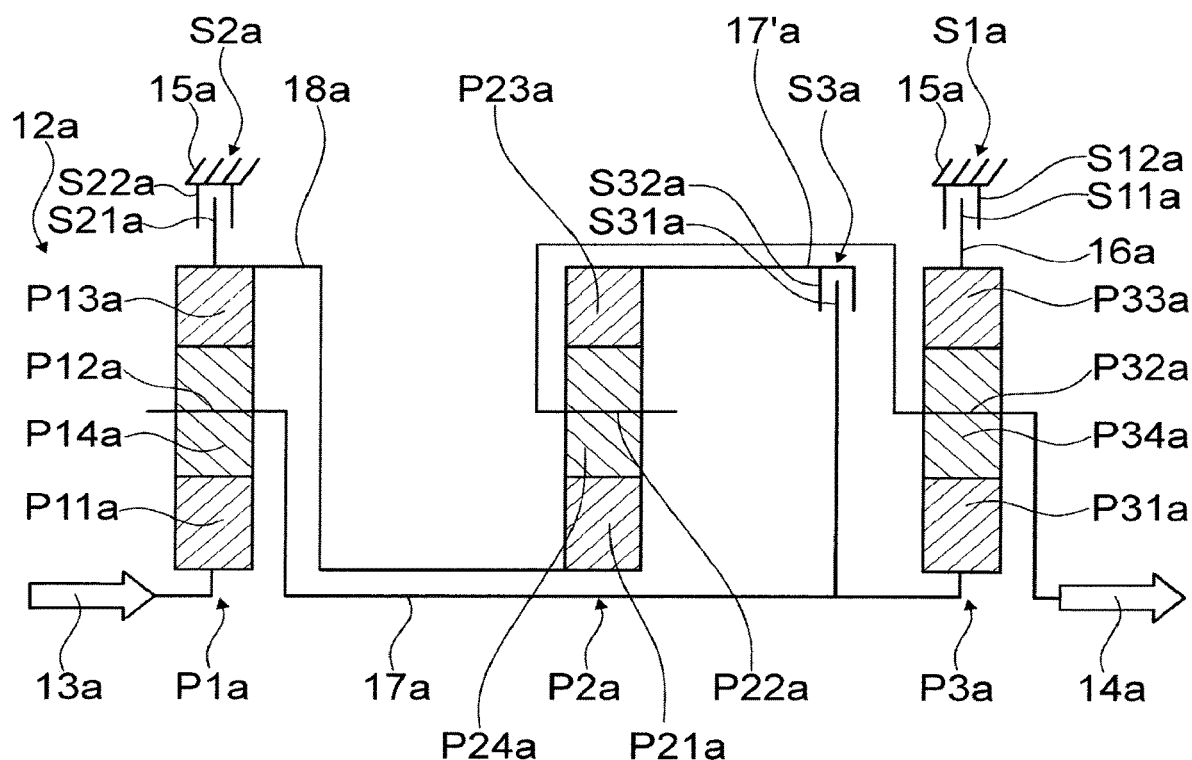
Figures 3, 4:
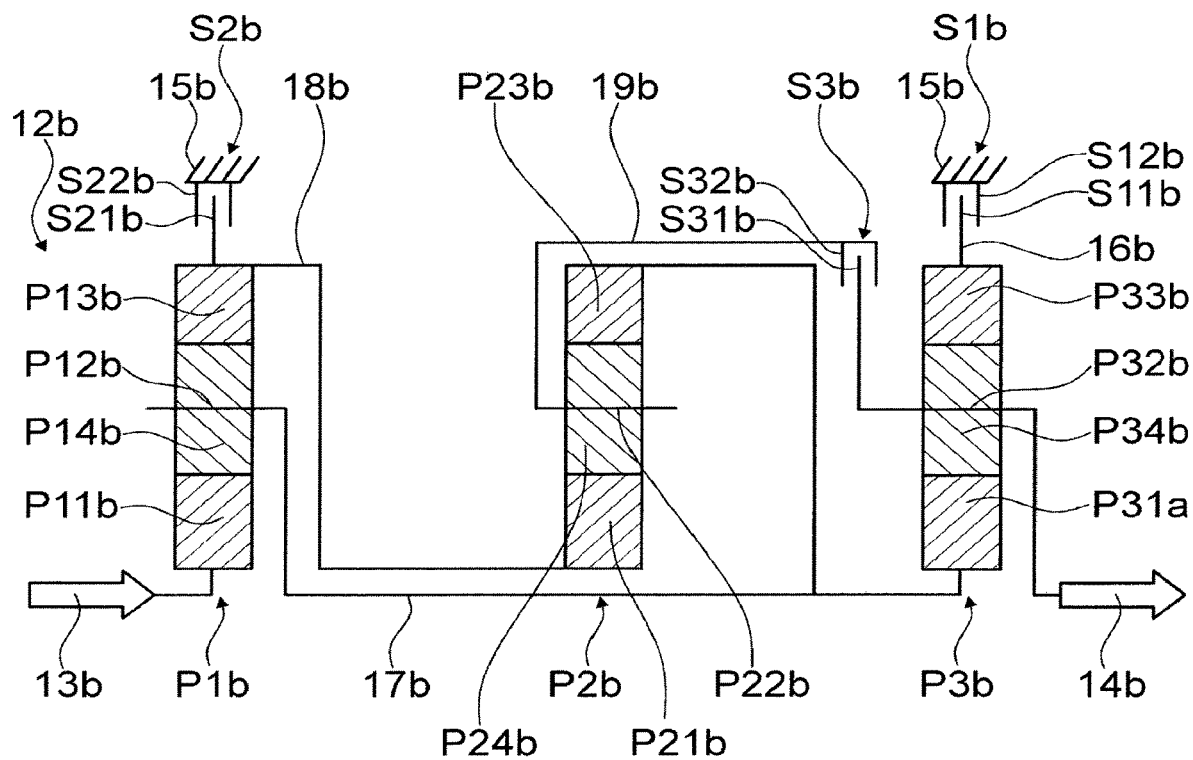
Figure 5:
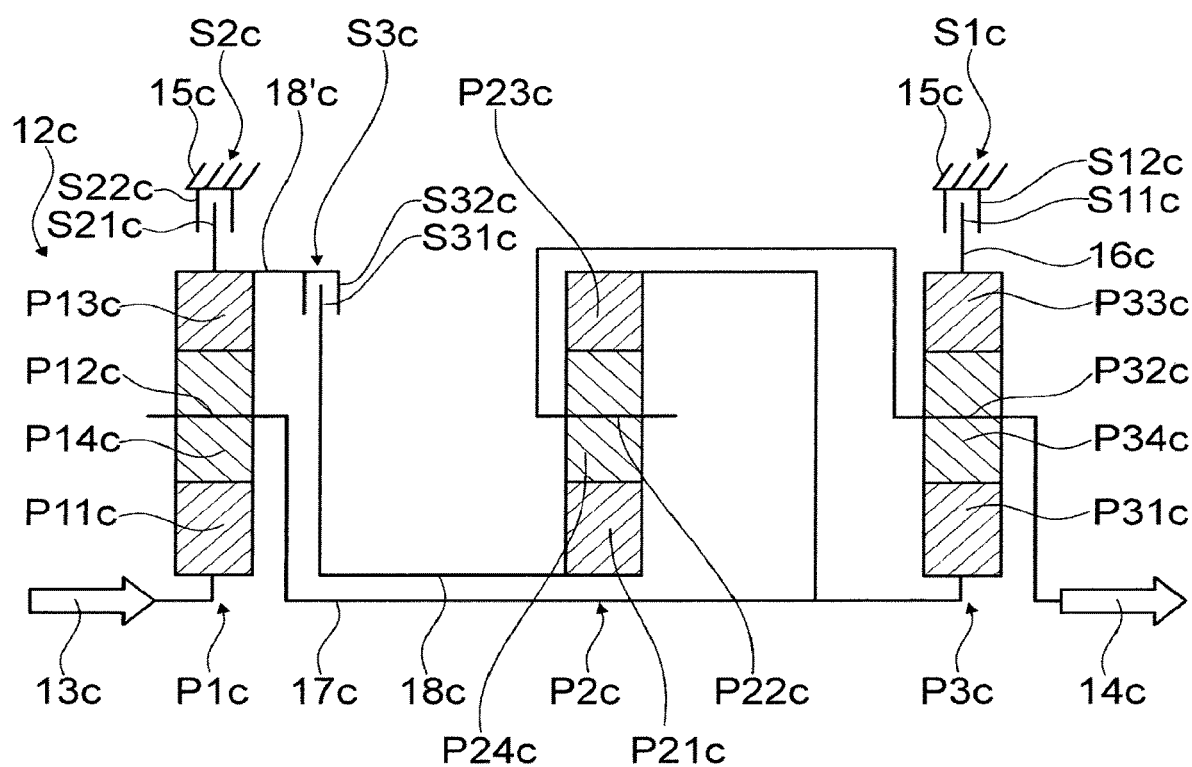
Figure 6:
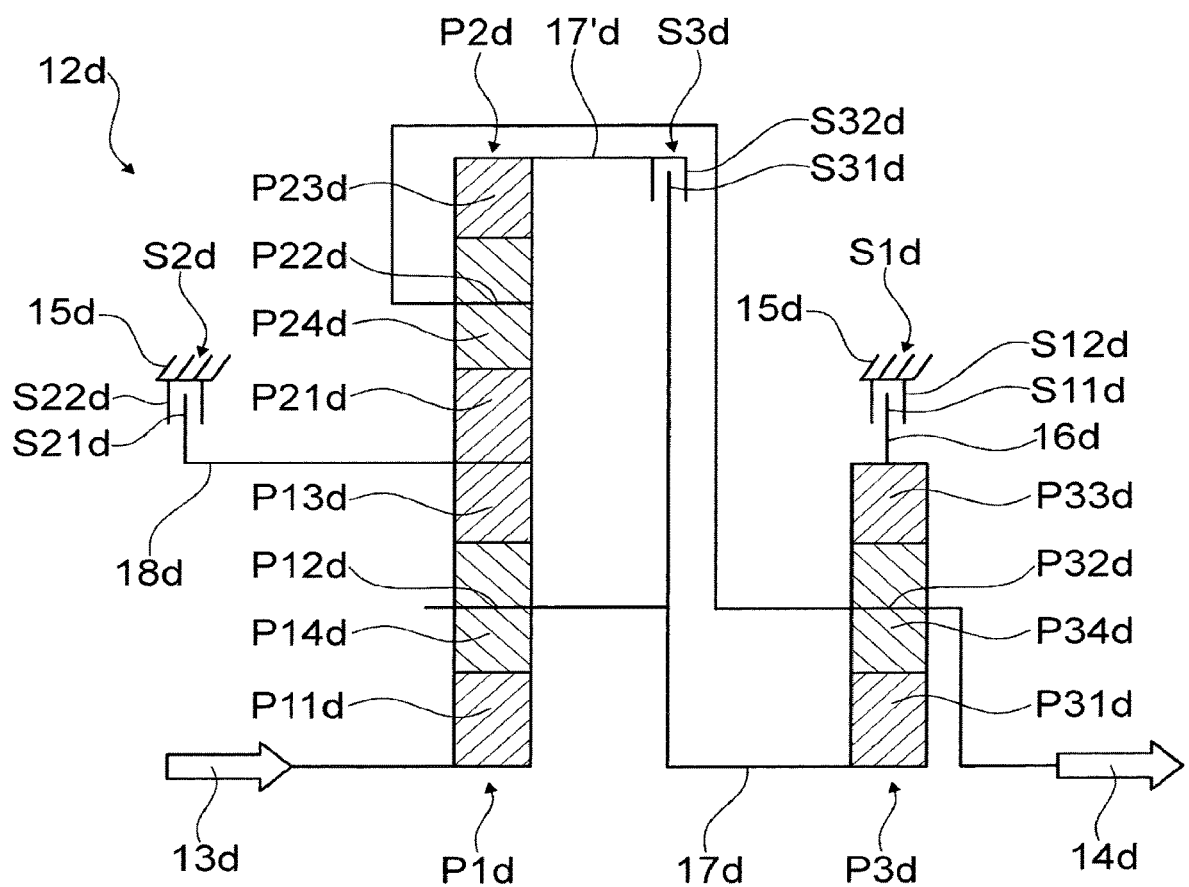
Figure 7:
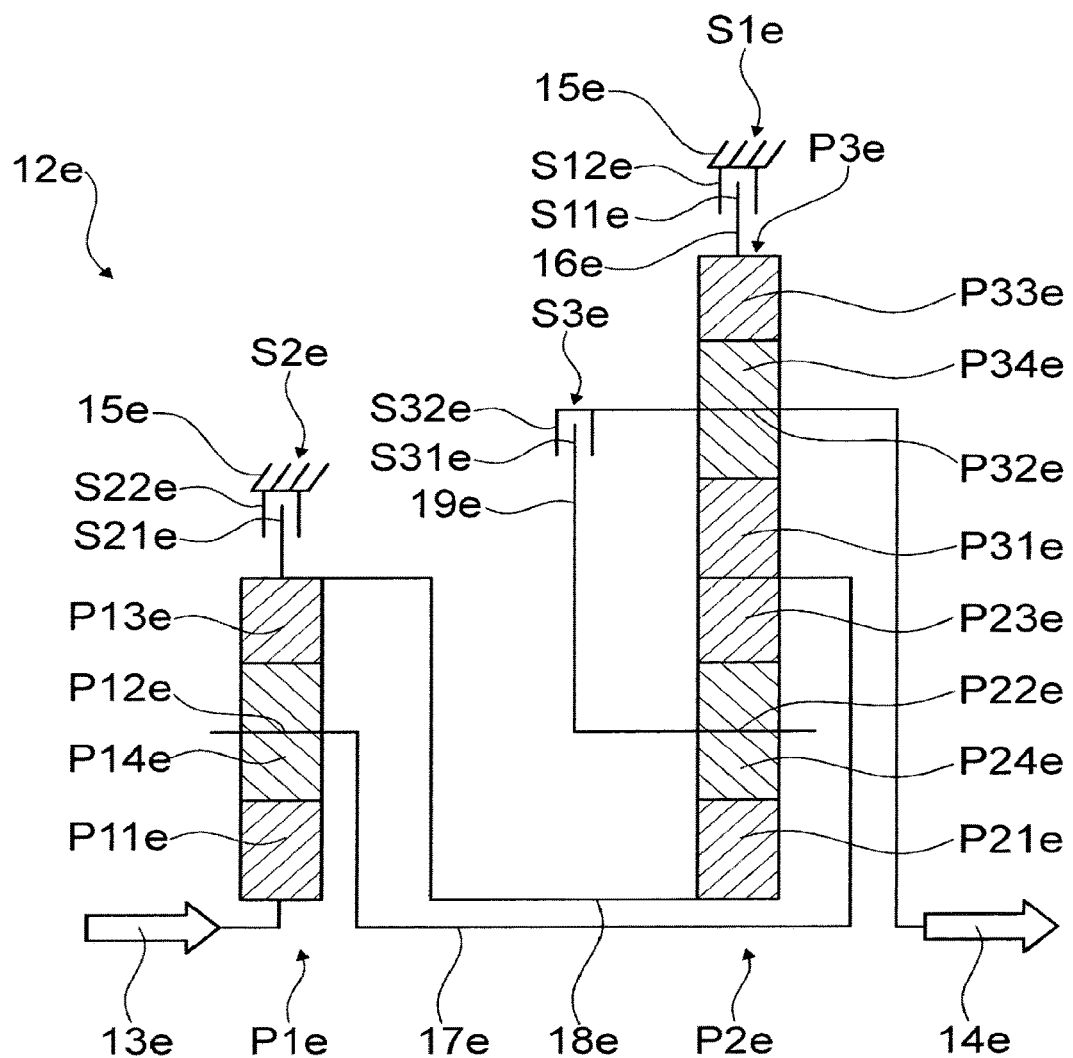

In the drawings:

FIG. 1 shows a motor vehicle comprising a drive device that comprises an electric motor and a multistep reduction gear, FIG. 2 is a transmission diagram of the multistep reduction gear, FIG. 3 is a shift diagram for the multistep reduction gear from FIG. 2, FIG. 4 is a transmission diagram having a different arrangement of a shift unit, FIG. 5 is a further transmission diagram having a different arrangement of a shift unit, FIG. 6 is a transmission diagram comprising planetary gear stages that are stacked in part, and FIG. 7 is a further transmission diagram comprising planetary gear stages that are stacked in part.

DETAILED DESCRIPTION

FIG. 1 shows a motor vehicle comprising a drive device. The drive device is intended for an electromotive drive of the motor vehicle. The motor vehicle may be designed as a purely electric vehicle. The drive device is intended only for the electromotive drive. It is conceivable in principle for the drive device to be combined with a second drive device for an internal combustion engine drive. For example, the proposed drive device that is intended for the electromotive drive may act on a first drive axle of the motor vehicle, while the drive device that is intended for the internal combustion engine drive acts on a second drive axle of the motor vehicle. If the proposed drive device is combined with an internal combustion engine drive device, it is also conceivable for the motor vehicle to comprise an additional compound gearing and/or selective gearing that is connected downstream of the two drive devices and is intended for attaching the two drive device to a single drive axle.

The drive device comprises an electric motor $10a$, an axle drive $11a$ and a multistep reduction gear $12a$ that is arranged between the electric motor $10a$ and the axle drive $11a$ (cf. FIG. 2). The electric motor $10a$ may be a permanently excited synchronous motor or a permanently excited asynchronous motor. The multistep reduction gear $12a$ is intended in terms of structure for shifting three differently geared forward gears $V1a$, $V2a$, $V3a$. The multistep reduction gear $12a$ comprises exactly three planetary gear stages $P1a$, $P2a$, $P3a$. The multistep reduction gear $12a$ comprises a main axis of rotation, with respect to which the first planetary gear stage $P1a$, the second planetary gear stage $P2a$ and the third planetary gear stage $P3a$ are arranged coaxially. The multistep reduction gear $12a$ is intended in terms of structure for shifting precisely three differently geared forward gears $V1a$, $V2a$, $V3a$. A number of forward gears $V1a$, $V2a$, $V3a$ actually used may be restricted depending on an operating strategy, for example restricted electronically by a correspondingly programmed control unit.

The multistep reduction gear $12a$ comprises precisely three shift units $S1a$, $S2a$, $S3a$ intended for shifting the forward gears $V1a$, $V2a$, $V3a$. Advantageously, the multistep reduction gear $12a$ can also be modified in that a non-shiftable connection for conjoint rotation is provided instead of the third shift unit $S3a$. This then results in a modified multistep reduction gear (not shown in greater detail in the drawings) that allows for two forward gears $V1a$ and $V3a$. The second gear $V2a$ that is possible in the multistep reduction gear $12a$ is not possible in the modified multistep reduction gear, because a permanent connection for conjoint rotation exists in place of the third shift unit $S3a$. The modified multistep reduction gear offers two differently geared forward gears and requires very little construction outlay. The modified multistep reduction gear can be formed from all the variants of the multistep reduction gear $12a$-$e$ shown below, by replacing the third shift unit $S3a$-$e$ with a permanent connection for conjoint rotation in each case.

The multistep reduction gear $12a$ comprises a transmission housing $15a$ that accommodates the planetary gear stages $P1a$, $P2a$, $P3a$ and the shift units $S1a$, $S2a$, $S3a$. The shift units $S1a$, $S2a$, $S3a$ are arranged in an operative manner within a gear set formed by the planetary gear stages $P1a$, $P2a$, $P3a$, i.e., the shift units $S1a$, $S2a$, $S3a$ are intended for establishing different operative connections between the planetary gear stages $P1a$, $P2a$, $P3a$ and/or between the planetary gear stages $P1a$, $P2a$, $P3a$ and the transmission housing $15a$.

The shift diagram shown in FIG. 3 indicates how the forward gears $V1a$, $V2a$, $V3a$ are shifted by closing the shift units $S1a$, $S2a$, $S3a$. The forward gears $V1a$, $V2a$, $V3a$ are shifted by closing two of the total of three shift units $S1a$, $S2a$, $S3a$ in each case. Each of the shift units $S1a$, $S2a$, $S3a$ is associated with precisely one of the forward gears $V1a$, $V2a$, $V3a$. In this case, power-shifting between two of the forward gears $V1a$, $V2a$, $V3a$ is, in particular, always possible if at most one of the shift units $S1a$, $S2a$, $S3a$ is closed and/or at most one of the shift units $S1a$, $S2a$, $S3a$ is opened in a shifting process, i.e., if a power flow is transferred from one of the shift units $S1a$, $S2a$, $S3a$ to another of the shift units $S1a$, $S2a$, $S3a$, or if a shifting state of just one of the shift units $S1a$, $S2a$, $S3a$ is changed. The three forward gears $V1a$, $V2a$, $V3a$ are in principle mutually entirely power shiftable.

In the case of the modified multistep reduction gear, for which a shift diagram is not shown, the forward gear $V2a$ is missing, because a permanent connection for conjoint rotation is provided in this multistep reduction gear instead of the third shift element $S3a$.

The multistep reduction gear $12a$ connects the electric motor $10a$ to the axle drive $11a$ of the motor vehicle. A transmission ratio between the electric motor $10a$ and the axle drive $11a$ can be changed by means of the multistep reduction gear $12a$. The multistep reduction gear $12a$ comprises a transmission input element $13a$ for introducing the drive torque output by the electric motor $10a$ into the multistep reduction gear $12a$. The electric motor $10a$ comprises a rotor which, in the embodiment shown, is permanently connected to the transmission input element $13a$ for conjoint rotation. The transmission input element $13a$ may be designed differently, for example as a shaft or as a flange.

The multistep reduction gear $12a$ further comprises a transmission output element $14a$ for extracting a drive torque output from the multistep reduction gear $12a$. In the embodiment shown, the axle drive 11a comprises a differential gear, the input of which is permanently connected to the transmission output element 14a for conjoint rotation. The axle drive 11a distributes the drive torque, provided by the electric motor 10a, to the two driving wheels of the drive axle. Alternatively, it is also conceivable for the transmission output element 14a to be permanently connected to an axle shaft and/or to one of the driving wheels for conjoint rotation. For example, the motor vehicle may comprise two of the drive devices that each act directly on a driving wheel of the motor vehicle. In addition, at least one further module may be arranged between the transmission output element 14a and the axle drive 11a, for example a four-wheel drive module that distributes the drive torque to two different drive axles. The transmission output element 14a may be designed differently, for example as a shaft, as a spur gear or as a pinion.

The transmission input element 13a and the transmission output element 14a are arranged so as to be coaxial to the main axis of rotation. The transmission input element 13a is arranged on a side of the multistep reduction gear 12a that faces the electric motor 10a. Different arrangements in the axial direction are conceivable in principle for the transmission output element 14a. In the multistep reduction gear 12a shown, the planetary gear stage P1a, P2a, P3a are arranged between the transmission input element 13a and the transmission output element 14a. In principle, it is possible to rearrange the planetary gear stages P1a, P2a, P3a such that the transmission output element 14a is arranged between two of the planetary gear stages P1a, P2a, P3a. The planetary gear stages P1a, P2a, P3a are arranged one behind the other in the axial direction. In order to remodel the multistep reduction gear 12a, it is possible to change a sequence of the planetary gear stages P1a, P2a, P3a along the main axis of rotation. The multistep reduction gear 12a comprises three planes, in which the planetary gear stages P1a, P2a, P3a are arranged. Numbering of the planes corresponds to a sequence of the planes relating in the following to the transmission input element 13a. The first plane is at a smaller spacing from the electric motor 10a than is the third plane.

The first planetary gear stage P1a is arranged along the main axis of rotation in the first plane. The first planetary gear stage P1a has a single planetary gear set and comprises a sun gear P11a, an internal gear P13a and a planet carrier P12a. The planet carrier P12a guides planetary gears P14a on a circular path. The planetary gears P14a mesh with the sun gear P11a and with the internal gear P13a. The planetary gears P14a are rotatably mounted on the planet carrier P12a.

The second planetary gear stage P2a is arranged along the main axis of rotation in the second plane. The second planetary gear stage P2a is arranged along the main axis of rotation on a side of the first planetary gear stage P1a that is remote from the transmission input element 13a. The second planetary gear stage P2a has a single planetary gear set and comprises a sun gear P21a, an internal gear P23a and a planet carrier P22a. The planet carrier P22a guides planetary gears P24a on a circular path. The planetary gears P24a mesh with the sun gear P21a and with the internal gear P23a. The planetary gears P24a are rotatably mounted on the planet carrier P22a.

The third planetary gear stage P3a is arranged along the main axis of rotation in the third plane. The third planetary gear stage P3a is arranged along the main axis of rotation on a side of the second planetary gear stage P2a that is remote from the transmission input element 13a. The third planetary gear stage P3a has a single planetary gear set and comprises a sun gear P31a, an internal gear P33a and a planet carrier P32a. The planet carrier P32a guides planetary gears P34a on a circular path. The planetary gears P34a mesh with the sun gear P31a and with the internal gear P33a. The planetary gears P34a are rotatably mounted on the planet carrier P32a.

Two of the shift units S1a, S2a, S3a are designed as brakes. The shift units S1a, S2a designed as brakes each comprise a rotatably mounted coupling element S11a, S21a and a coupling element S12a, S22a that is fixed on the housing. The shift units S1a, S2a each connect the rotatably mounted coupling element S11a, S21a thereof to the transmission housing 15a for conjoint rotation. Each of the rotatably mounted coupling elements S11a, S21a of the shift units S1a, S2a is permanently connected to at least one of the sun gears P11a, P21a, P31a, one of the planet carriers P12a, P22a, P32a and/or one of the internal gears P13a, P23a, P33a for conjoint rotation. The coupling elements S12a, S22a of the shift units S1a, S2a that are fixed on the housing are permanently connected to the transmission housing 15a for conjoint rotation.

The remaining shift unit S3a is designed as a clutch. The shift unit S3a designed as a clutch comprises a first rotatably mounted coupling element S31a and a second rotatably mounted coupling element S32a. The shift unit S3a interconnects the two coupling elements S31a, S32a thereof for conjoint rotation. Each of the coupling elements S31a, S32a of the shift unit S3a is permanently connected to at least one of the sun gears P11a, P21a, P31a, one of the planet carriers P12a, P22a, P32a and/or one of the internal gears P13a, P23a, P33a for conjoint rotation.

In order to connect the planetary gear stages P1a, P2a, P3a to one another and to the coupling elements S11a, S12a, S21a, S22a, S31a, S32a, the multistep reduction gear 12a comprises a plurality of transmission elements 16a, 17a, 17'a, 18a. The four transmission elements 16a, 17a, 17'a, 18a support and/or transmit torques and/or rotational movements within the gear set formed by the planetary gear stages P1a, P2a, P3a. Each of the transmission elements 16a, 17a, 17'a, 18a permanently interconnects at least two of the sun gears P11a, P21a, P31a, planet carriers P12a, P22a, P32a, internal gears P13a, P23a, P33a and/or coupling element S11a, S12a, S21a, S22a, S31a, S32a for conjoint rotation, or permanently supports at least one of the sun gears P11a, P21a, P31a, planet carriers P12a, P22a, P32a and/or internal gears P13a, P23a, P33a against the transmission housing 15a.

The transmission input element 13a forms a transmission input shaft that permanently interconnects the transmission input element 13a and the sun gear P11a of the first planetary gear stage P1a for conjoint rotation. The transmission input element 13a is attached to the sun gear P11a on the input side.

The transmission output element 14a forms a transmission output shaft that permanently interconnects the transmission output element 14a, the planet carrier P32a of the third planetary gear stage P3a and the planet carrier P22a of the second planetary gear stage P2a for conjoint rotation. The transmission output shaft formed by the transmission output element 14a is guided through the third planetary gear stage P3a as the planet carrier P32a, surrounds the second planetary gear stage P2a, and is guided radially inwards between the first planetary gear stage P1a and the second planetary gear stage P2a in order to attach the planet carrier P22a.

The transmission element 16a forms an attachment that permanently interconnects the internal gear P33a of the third planetary gear stage P3a and the first coupling element S11a of the first shift unit S1a for conjoint rotation.

The transmission element 17a forms an intermediate shaft that permanently interconnects the planet carrier P12a of the first planetary gear stage P1a, the sun gear P31a of the third planetary gear stage P3a and the first coupling element S31a of the third shift unit S3a for conjoint rotation. The intermediate shaft formed by the transmission element 17a passes through the second planetary gear stage P2a. In order to attach the coupling element S31a, the intermediate shaft formed by the transmission element 17a is guided radially outwards between the second planetary gear stage P2a and the third planetary gear stage P3a.

The transmission element 17'a forms an attachment that permanently interconnects the internal gear P23a of the second planetary gear stage P2a and the second coupling element second S32a of the third shift unit S3a for conjoint rotation.

The transmission element 18a forms a transmission shaft that permanently interconnects the internal gear P13a of the first planetary gear stage P1a, the first coupling element S21a of the second shift unit S2a, and the sun gear P21a of the second planetary gear stage P2a for conjoint rotation. The transmission shaft formed by the transmission element 18a is guided radially inwards between the first planetary gear stage P1a and the second planetary gear stage P2a.

The first shift unit S1a is arranged so as to be at the level of the third planetary gear stage P3a, in the axial direction. The second shift unit S2a is arranged so as to be axially at the level of the first planetary gear stage P1a. The third shift unit S3a is arranged so as to be axially between the second planetary gear stage P2a and the third planetary gear stage P3a. In principle, a different spatial arrangement of the shift units S1a, S2a, S3a is possible.

The first shift unit S1a fixes the internal gear P33a of the third planetary gear stage P3a on the housing. The second shift unit S2a fixes the internal gear P13a of the first planetary gear stage P1a and the sun gear P21a of the second planetary gear stage P2a on the housing. The third shift unit S3a connects the internal gear P23a of the second planetary gear stage P2a to the sun gear P31a of the third planetary gear stage P3a and the internal gear P13a of the first planetary gear stage P1a for conjoint rotation. If the shift unit S3a is open, the transmission element 17'a and the internal gear P23a of the second planetary gear stage P2a that is permanently connected to the transmission element 17'a for conjoint rotation are freely rotatable relative to the remaining transmission elements 16a, 17a, 18a. The freely rotatable internal gear P23a decouples the second planetary gear stage P2a from the first planetary gear stage P1a and from the third planetary gear stage P3a when the third shift unit S3a is open. The third shift unit S1a is intended for decoupling the second planetary gear stage P2a from the first planetary gear stage P1a and from the third planetary gear stage P3a.

The shift units S1a, S2a are designed so as to be external, i.e., the shift units S1a, S2a can be supplied with an actuating medium without operating medium lines being passed through a rotatably mounted component. The shift unit S3a is internal, i.e., requires operating medium to be passed through a rotatably mounted component. All the shift units S1a, S2a, S3a are actuated hydraulically.

In the embodiment described, the axle drive 11a comprises the differential gear, the outputs of which are arranged so as to be coaxial to the main axis of rotation of the multistep reduction gear 12a (cf. FIG. 1). In the embodiment described, the axle drive 11a additionally comprises two axle shafts for driving the driving wheels of a drive axle. In an advantageous embodiment, the axle drive 11a has a main axis of rotation arranged so as to be coaxial to the main axis of rotation of the multistep reduction gear 12a. One of the axle shafts preferably passes through at least the transmission input element 13a and the electric motor 10a. It is possible, in particular, to integrate the axle drive 11a in the multistep reduction gear 12a at least in part. Nesting of the multistep reduction gear 12a and the axle drive 11a depends, in particular, on a position of the differential gear along the main axis of rotation of the multistep reduction gear 12a. If the differential gear is arranged between the transmission input element 13a and the transmission output element 14a, one of the axle shafts passes through the transmission input element 13a and the electric motor 10a, while the other axle shaft passes through the transmission output element 14a. If the differential gear of the axle drive 11a is arranged on the transmission output side, one of the axle shafts preferably passes through the transmission output element 14a, the transmission input element 13a and the electric motor 10a. It is conceivable, too, in an embodiment in which the axle drive 11a is intended for directly attaching just one driving wheel, for the transmission output element 14a to pass through the transmission input element 13a and the electric motor 10a, in the form of an inner shaft, with the result that the electric motor 10a is arranged between the driving wheel and the multistep reduction gear 12a.

FIG. 4 shows, as a second embodiment, a transmission diagram of a multistep reduction gear 12b for a drive device comprising an electric motor and an axle drive. The multistep reduction gear 12b is intended, at least in structural terms, for shifting three forward gears. The transmission diagram is kinematically equivalent to that of the first embodiment.

The multistep reduction gear 12b comprises a transmission input element 13b for attaching the electric motor for conjoint rotation, and a transmission output element 14b for attaching the axle drive for conjoint rotation. The multistep reduction gear 12b additionally comprises a gear set comprising a first planetary gear stage P1b, a second planetary gear stage P2b and a third planetary gear stage P3b that each comprise a sun gear P11b, P21b, P31b, an internal gear P13b, P23b, P33b and a planet carrier P12b, P22b, P32b that guides planetary gears P14b, P24b, P34b on a circular path around the corresponding sun gear P11b, P21b, P31b. The multistep reduction gear 12b further comprises three shift units S1b, S2b, S3b, each comprising two coupling elements S11b, S12b, S21b, S22b, S31b, S32b. In order to transmit power flows between the planetary gear stages P1b, P2b, P3b and/or to provide support against a transmission housing 15b, the multistep reduction gear 12b comprises a plurality of transmission elements 16b, 17b, 18b, 19b.

The multistep reduction gear 12b differs from that of the first embodiment, in particular, by an arrangement of the shift unit S3b. The shift unit S3b is intended for connecting the planet carrier P22b of the second planetary gear stage P2b to the planet carrier P32b of the third planetary gear stage P3b and to the transmission output element 14b for conjoint rotation.

The transmission element 19b forms a transmission shaft that permanently interconnects the planet carrier P22b of the second planetary gear stage P2b and the second coupling element S32b of the third shift unit S3b for conjoint rotation. The transmission output element 14b forms a transmission output shaft that permanently interconnects the transmission output element 14b, the planet carrier P32b of the third planetary gear stage P3b and the first coupling element S31b of the third shift unit S3$b$ for conjoint rotation. The transmission element 17$b$ forms a transmission shaft that permanently interconnects the planet carrier P12$b$ of the first planetary gear stage P1$b$, the sun gear P31$b$ of the third planetary gear stage P3$b$, and the internal gear P23$b$ of the second planetary gear stage P2$b$ for conjoint rotation.

The third shift unit S1$b$ is intended for decoupling the second planetary gear stage P2$b$ from the first planetary gear stage P1$b$ and from the third planetary gear stage P3$b$. If the shift unit S3$b$ is open, the transmission element 19$b$ and the planet carrier P22$b$ of the second planetary gear stage P2$b$ that is permanently connected to the transmission element 19$b$ for conjoint rotation are freely rotatable relative to the remaining transmission elements 16$b$, 17$b$, 18$b$. The freely rotatable planet carrier P22$b$ decouples the second planetary gear stage P2$b$ from the first planetary gear stage P1$b$ and from the third planetary gear stage P3$b$ when the shift unit S3$b$ is open.

FIG. 5 shows, as a third embodiment, a transmission diagram of a multistep reduction gear 12$c$ for a drive device comprising an electric motor and an axle drive. The multistep reduction gear 12$c$ is intended, at least in structural terms, for shifting three forward gears. The transmission diagram is kinematically equivalent to that of the first embodiment.

The multistep reduction gear 12$c$ comprises a transmission input element 13$c$ for attaching the electric motor for conjoint rotation, and a transmission output element 14$c$ for attaching the axle drive for conjoint rotation. The multistep reduction gear 12$c$ additionally comprises a gear set comprising a first planetary gear stage P1$c$, a second planetary gear stage P2$c$ and a third planetary gear stage P3$c$ that each comprise a sun gear P11$c$, P21$c$, P31$c$, an internal gear P13$c$, P23$c$, P33$c$ and a planet carrier P12$c$, P22$c$, P32$c$ that guides planetary gears P14$c$, P24$c$, P34$c$ on a circular path around the corresponding sun gear P11$c$, P21$c$, P31$c$. The multistep reduction gear 12$c$ further comprises three shift units S1$c$, S2$c$, S3$c$, each comprising two coupling elements S11$c$, S12$c$, S21$c$, S22$c$, S31$c$, S32$c$. In order to transmit power flows between the planetary gear stages P1$c$, P2$c$, P3$c$ and/or to provide support against a transmission housing 15$c$, the multistep reduction gear 12$c$ comprises a plurality of transmission elements 16$c$, 17$c$, 18$c$, 18'$c$ The multistep reduction gear 12$c$ also differs from that of the first embodiment, in particular, by an arrangement of the shift unit S3$c$. The shift unit S3$c$ connects the sun gear P21$c$ of the second planetary gear stage P2$c$ to the internal gear P13$c$ of the first planetary gear stage P1$c$ for conjoint rotation.

The transmission element 18$c$ forms a transmission shaft that permanently interconnects the sun gear P21$c$ of the second planetary gear stage P2$c$ and the first coupling element S31$c$ of the third shift unit S3$c$ for conjoint rotation. The transmission element 18'$c$ forms an attachment that permanently interconnects the internal gear P13$c$ of the first planetary gear stage P1$c$, the first coupling element S21$c$ of the second shift unit S2$c$, and the second coupling element S32$c$ of the third shift unit S3$c$ for conjoint rotation. The transmission element 17$c$ forms a transmission shaft that permanently interconnects the planet carrier P12$c$ of the first planetary gear stage P1$c$, the sun gear P31$c$ of the third planetary gear stage P3$c$, and the internal gear P23$c$ of the second planetary gear stage P2$c$ for conjoint rotation.

The third shift unit S1$c$ decouples the second planetary gear stage P2$c$ from the first planetary gear stage P1$c$ and from the third planetary gear stage P3$c$. If the shift unit S3$c$ is open, the transmission element 18$c$ and the sun gear P21$c$ of the second planetary gear stage P2$c$ that is permanently connected to the transmission element 18$c$ for conjoint rotation are freely rotatable relative to the remaining transmission elements 16$c$, 17$c$, 18$c$. The freely rotatable sun gear P21$c$ decouples the second planetary gear stage P2$c$ from the first planetary gear stage P1$c$ and from the third planetary gear stage P3$c$ when the shift unit S3$c$ is open.

FIG. 6 shows, as a fourth embodiment, a transmission diagram of a multistep reduction gear 12$d$ for a drive device comprising an electric motor and an axle drive. The multistep reduction gear 12$d$ is intended, at least in structural terms, for shifting three forward gears. The transmission diagram is structurally similar to that of the first embodiment.

The multistep reduction gear 12$d$ comprises a transmission input element 13$d$ for attaching the electric motor for conjoint rotation, and a transmission output element 14$d$ for attaching the axle drive for conjoint rotation. The multistep reduction gear 12$d$ additionally comprises a gear set comprising a first planetary gear stage P1$d$, a second planetary gear stage P2$d$ and a third planetary gear stage P3$d$ that each comprise a sun gear P11$d$, P21$d$, P31$d$, an internal gear P13$d$, P23$d$, P33$d$ and a planet carrier P12$d$, P22$d$, P32$d$ that guides planetary gears P14$d$, P24$d$, P34$d$ on a circular path around the corresponding sun gear P11$d$, P21$d$, P31$d$. The multistep reduction gear 12$d$ further comprises three shift units S1$d$, S2$d$, S3$d$ that each comprise two coupling elements S11$d$, S12$d$, S21$d$, S22$d$, S31$d$, S32$d$. In order to transmit power flows between the planetary gear stages P1$d$, P2$d$, P3$d$ and/or to provide support against a transmission housing 15$d$, the multistep reduction gear 12$d$ comprises a plurality of transmission elements 16$d$, 17$d$, 17'$d$, 18$d$.

The multistep reduction gear 12$d$ differs from that of the first embodiment, in particular, by an arrangement of the planetary gear stages P1$d$, P2$d$, P3$d$. In contrast to the first embodiment, the first planetary gear stage P1$d$ and the second planetary gear stage P2$d$ are stacked. The multistep reduction gear 12$d$ comprises two planes, in which the three planetary gear stages P1$d$, P2$d$, P3$d$ are arranged. The first planetary gear stage P1$d$ and the second planetary gear stage P2$d$ are arranged in the first plane. The first planetary gear stage P1$d$ is arranged so as to be radially inside the second planetary gear stage P2$d$. The first shift unit S1$d$ is arranged so as to be axially at the level of the planetary gear stages P1$d$, P2$d$. The second shift unit S2$d$ is arranged so as to be axially at the level of the third planetary gear stage P3$d$. The third shift unit S3$d$ is arranged between the planetary gear stages P1$d$, P2$d$ and the planetary gear stage P3$d$. The third planetary gear stage P3$d$ is arranged in the second plane.

FIG. 7 shows, as a fifth embodiment, a transmission diagram of a multistep reduction gear 12$e$ for a drive device comprising an electric motor and an axle drive. The multistep reduction gear 12$e$ is intended, at least in structural terms, for shifting three forward gears. The transmission diagram is structurally similar to that of the second embodiment.

The multistep reduction gear 12$e$ comprises a transmission input element 13$e$ for attaching the electric motor for conjoint rotation, and a transmission output element 14$e$ for attaching the axle drive for conjoint rotation. The multistep reduction gear 12$e$ additionally comprises a gear set comprising a first planetary gear stage P1$e$, a second planetary gear stage P2$e$ and a third planetary gear stage P3$e$ that each comprise a sun gear P11$e$, P21$e$, P31$e$, an internal gear P13$e$, P23$e$, P33$e$ and a planet carrier P12$e$, P22$e$, P32$e$ that guides planetary gears P14$e$, P24$e$, P34$e$ on a circular path around the corresponding sun gear P11$e$, P21$e$, P31$e$. The multistep reduction gear 12e further comprises three shift units S1e, S2e, S3e that each comprise two coupling elements S11e, S12e, S21e, S22e, S31e, S32e. In order to transmit power flows between the planetary gear stages P1e, P2e, P3e and/or to provide support against a transmission housing 15e, the multistep reduction gear 12e comprises a plurality of transmission elements 16e, 17e, 18e, 19e.

The multistep reduction gear 12e differs from that of the second embodiment, in particular, by an arrangement of the planetary gear stages P1e, P2e, P3e. In contrast to the second embodiment, the second planetary gear stage P2e and the third planetary gear stage P3e are stacked. The multistep reduction gear 12e comprises two planes, in which the three planetary gear stages P1e, P2e, P3e are arranged. The first planetary gear stage P1e is arranged in the first plane. The second planetary gear stage P2e and the third planetary gear stage P3e are arranged in the second plane. The second planetary gear stage P2e is arranged so as to be radially inside the third planetary gear stage P3e. The second shift unit S2e is arranged so as to be axially at the level of the first planetary gear stage P1e. The second shift unit S2e is arranged so as to be axially at the level of the planetary gear stages P2e P3e. The third shift unit S3e is arranged between the planetary gear stage P1e and the planetary gear stages P2e, P3e.

Particularly advantageously, a variant of the modified multistep reduction gear (not shown in greater detail) that is optimized in terms of installation space can be provided from the multistep reduction gear 12e, by replacing the third shift unit S3e of the multistep reduction gear 12e with a permanent connection for conjoint rotation between the planet carrier P32e of the third planetary gear stage P3e and the planet carrier P22e of the second planetary gear stage P2e. As already described in principle above, it is thus possible to provide an advantageous multistep reduction gear that comprises two shift units and is intended for shifting two forward gears.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 10 electric motor
11 axle drive
12 multistep reduction gear
13 transmission input element
14 transmission output element
15 transmission housing
16 transmission element
17 transmission element
17' transmission element
18 transmission element
18' transmission element
19 transmission element
P1 planetary gear stage
P11 sun gear
P12 planet carrier
P13 internal gear
P14 planetary gears
P2 planetary gear stage
P21 sun gear
P22 planet carrier
P23 internal gear
P24 planetary gears
P3 planetary gear stage
P31 sun gear
P32 planet carrier
P33 internal gear
P34 planetary gears
S1 shift unit
S11 coupling element
S12 coupling element
S2 shift unit
S21 coupling element
S22 coupling element
S3 shift unit
S31 coupling element
S32 coupling element
V1 forward gear
V2 forward gear
V3 forward gear

The invention claimed is:
1. A drive device for an electric vehicle, the drive device comprising:
   an electric motor;
   an axle drive; and
   a multistep reduction gear arranged between the electric motor and the axle drive, wherein the at least one multistep reduction gear comprises
      precisely three planetary gear stages that are operatively interconnected, wherein the three planetary gear stages comprise first, second, and third planetary gear stages, and each of the planetary gear stages comprises a sun gear, an internal gear, and a planet carrier;
      first and second shift units;
      a transmission input element configured for attachment to the electric motor for conjoint rotation; and
      a transmission output element configured for attachment to the axle drive for conjoint rotation,
      wherein the transmission input element is permanently connected to the sun gear of the first planetary gear stage for conjoint rotation,
      wherein the transmission output element is permanently connected to the planet carrier of the third planetary gear stage for conjoint rotation,
      wherein the planet carrier of the first planetary gear stage and the sun gear of the third planetary gear stage are permanently interconnected for conjoint rotation,
      wherein the internal gear of the first planetary gear stage and the sun gear of the second planetary gear stage are permanently interconnected for conjoint rotation, and wherein
the planet carrier of the second planetary gear stage and the planet carrier of the third planetary gear stage are permanently interconnected for conjoint rotation, or a third shift unit is configured for connecting the planet carrier of the second planetary gear stage to the planet carrier of the third planetary gear stage for conjoint rotation.

2. The drive device of claim 1, wherein the internal gear of the second planetary gear stage, the planet carrier of the first planetary gear stage, and the sun gear of the third planetary gear stage are permanently interconnected for conjoint rotation.

3. The drive device of claim 1, wherein the third shift unit is configured for connecting the internal gear of the second planetary gear stage to the planet carrier of the first planetary gear stage and to the sun gear of the third planetary gear stage for conjoint rotation, and the planet carrier of the second planetary gear stage and the planet carrier of the third planetary gear stage are permanently interconnected for conjoint rotation.

4. The drive device of claim 1, wherein the third shift unit is configured for interconnecting the internal gear of the first planetary gear stage and the sun gear of the second planetary gear stage for conjoint rotation, and the planet carrier of the second planetary gear stage and the planet carrier of the third planetary gear stage are permanently interconnected for conjoint rotation.

5. The drive device of claim 1, wherein the first shift unit is configured for fixing the internal gear of the third planetary gear stage on the housing.

6. The drive device of claim 1, wherein the second shift unit is configured for fixing at least the internal gear of the first planetary gear stage on the housing.

7. The drive device of claim 1, wherein the axle drive comprises at least one axle shaft that passes through the transmission input element, the transmission output element and/or the electric motor.

* * * * *